(12) United States Patent
Molinier et al.

(10) Patent No.: US 7,153,807 B2
(45) Date of Patent: Dec. 26, 2006

(54) CATALYSTS FOR SELECTIVE HYDROGENATION OF ALKYNES AND ALKADIENES

(75) Inventors: Michel Molinier, Houston, TX (US); John Di-Yi Ou, Houston, TX (US); Michael A. Risch, Seabrook, TX (US)

(73) Assignee: Exxon Mobil Chemical Patents Inc., Houston, TX (US)

( * ) Notice: Subject to any disclaimer, the term of this patent is extended or adjusted under 35 U.S.C. 154(b) by 532 days.

(21) Appl. No.: 10/379,495

(22) Filed: Mar. 4, 2003

(65) Prior Publication Data

US 2004/0176651 A1 Sep. 9, 2004

(51) Int. Cl.
*B01J 27/22* (2006.01)
*B01J 27/224* (2006.01)
*B01J 21/08* (2006.01)
*B01J 23/56* (2006.01)
*B01J 23/44* (2006.01)

(52) U.S. Cl. .................. 502/177; 502/178; 502/232; 502/240; 502/325; 502/330; 502/332; 502/339

(58) Field of Classification Search ............. 502/177, 502/178, 232, 240, 325, 330, 332, 339
See application file for complete search history.

(56) References Cited

U.S. PATENT DOCUMENTS

| | | | |
|---|---|---|---|
| 3,580,837 A | 5/1971 | Pollitzer | 208/57 |
| 3,689,401 A | 9/1972 | Gomi et al. | 208/57 |
| 3,770,619 A | 11/1973 | Derrien et al. | 208/255 |
| 3,969,221 A | 7/1976 | Mitchell, III et al. | 208/139 |
| 4,013,548 A | 3/1977 | Pollitzer et al. | 208/255 |
| 4,113,603 A | 9/1978 | Bauer | 208/89 |
| 4,131,536 A * | 12/1978 | Adams et al. | 208/139 |
| 4,333,854 A * | 6/1982 | Antos | 502/174 |
| 4,361,500 A * | 11/1982 | Mathe et al. | 502/167 |
| 4,658,080 A * | 4/1987 | McFarland | 585/658 |
| 4,865,719 A * | 9/1989 | Moser et al. | 208/139 |
| 4,923,595 A * | 5/1990 | Moser et al. | 208/139 |
| 5,227,553 A | 7/1993 | Polanek et al. | 585/259 |
| 5,817,901 A | 10/1998 | Trambouze et al. | 585/259 |
| 6,255,548 B1 * | 7/2001 | Didillon et al. | 585/259 |
| 6,498,280 B1 * | 12/2002 | Uzio et al. | 585/654 |
| 6,503,866 B1 * | 1/2003 | Shepherd et al. | 502/332 |
| 6,512,155 B1 * | 1/2003 | Johnson et al. | 585/481 |
| 2002/0004622 A1 | 1/2002 | Dai et al. | 585/260 |
| 2002/0022754 A1 | 2/2002 | Boyer et al. | 585/265 |
| 2002/0068843 A1 | 6/2002 | Dai et al. | 585/260 |

FOREIGN PATENT DOCUMENTS

| | | |
|---|---|---|
| EP | 0541871 | 5/1993 |
| GB | 1432096 | 4/1976 |
| GB | 2131043 | 6/1984 |

OTHER PUBLICATIONS

McGown, et al. *Hydrogenation of Acetylene in Excess Ethylene on an Alumina-Supported Palladium Catalyst at Atmospheric Pressure in a Spinning Basket Reactor*, Journal of Catalysis 51, pp. 173-184 (1978), no month.

Battiston, et al., Performance and Aging of Catalysts for the Selective Hydrogenation of Acetylene: A Micropilot-Plant Study, Applied Catalysis 2, pp. 1-17 (1982), no month.

LeViness, Stephen Claude. *Polymer formation, deactivation, and ethylene selectivity decline in Pd/A1203 catalyzed selective acetylene hydrogenation*, Rice University, pp. 211-259 (1989), no month.

* cited by examiner

*Primary Examiner*—J. A. Lorengo
*Assistant Examiner*—Patricia L. Hailey

(57) ABSTRACT

Catalysts have been discovered that are useful in hydrogenation reactions, and particularly for the selective hydrogenation of acetylene and/or methyl acetylene (MA) and/or propadiene (PD) in light olefin-rich feedstreams. These catalysts can selectively hydrogenate acetylene with less selectivity to making oligomers (green oil) as compared with existing commercial catalysts, particularly palladium catalysts. These catalysts are non-palladium catalysts, and have three different constituents that are metal or metal-based components. The metal of the first constituent may be nickel or platinum, the metal of the second constituent may be from Groups 1–10, and the metal of the third constituent may be from Groups 11–12, where the Groups are of the Periodic Table of Elements (new IUPAC notation).

5 Claims, No Drawings

CATALYSTS FOR SELECTIVE HYDROGENATION OF ALKYNES AND ALKADIENES

FIELD OF THE INVENTION

The present invention relates to hydrogenation catalysts, and more particularly relates, in one embodiment, to catalysts having three different categories of metals and methods of using them for selective hydrogenation of alkynes and alkadienes.

BACKGROUND OF THE INVENTION

Light olefin products (e.g. ethylene, propylene, and butene) generated by various technologies such as gas to olefins, methanol to olefins, steam cracking or fluid catalytic cracking contain highly unsaturated impurities, namely, alkynes and alkadienes, as by-products. These impurities must be removed from light olefins because they are poisons to downstream olefin polymerization catalysts. Currently, selective hydrogenation of alkynes and alkadienes, such as acetylene, methyl acetylene (MA), propadiene (PD), and/or butadiene (BD), into the respective olefins is the most attractive technology option for olefin manufacturing plants. Traditionally, catalysts such as nickel or palladium supported on alumina have been used for the selective hydrogenation. Palladium-based catalysts, however, are becoming the workhorse of the industry by gradually replacing the older nickel-based catalysts.

The selective hydrogenation of acetylene and/or MAPD and/or BD is typically carried out in four unit types:

Front-End Selective Catalytic Hydrogenation Reactors, where the feed is composed of C3 and lighter hydrocarbons, or C2 and lighter hydrocarbons. In the case of raw gas applications, other components such as butadiene, ethyl acetylene, dimethyl acetylene, vinyl acetylene, cyclopentadiene, benzene, and toluene can also be present.

Back-End Selective Catalytic Hydrogenation Reactors, where the feed is composed of an ethylene-rich stream.

MAPD Selective Catalytic Hydrogenation Reactors, where the feed is composed of a propylene-rich stream.

BD Selective Catalytic Hydrogenation Reactors, where the feed is composed of a butylene-rich stream.

Current commercial selective hydrogenation catalysts suffer from the problems of producing significant amounts of saturates (e.g. ethane, propane, butane) and green oil (C4+ oligomer compounds). The saturates come from over-hydrogenation of the alkynes and/or alkadienes and the hydrogenation of olefins. Green oil is the result of oligomerization of the alkynes and/or alkadienes and/or olefins. Both saturates and green-oil are undesirable owing to their adverse effect on olefins-gain selectivity. Green oil, however, is especially troublesome in that it also decreases catalyst life by depositing heavy compounds on catalyst surfaces.

It would be desirable to have catalysts and a process for the accurate and controlled hydrogenation of alkadienes and alkynes in olefin product streams for both economic and operational benefits including, but not necessarily limited to, provision of more consistent product quality, reduction in the amount of olefin hydrogenated to ethane in the acetylene reactor, elimination of olefin production loss due to acetylene reactor shut-down required by process upsets, extension of the life of catalysts by elimination of reactor runaways, and increase in run time between regeneration of catalyst by reduced formation of heavy hydrocarbon poisons, and reduction of overall hydrogen consumption.

SUMMARY OF THE INVENTION

Accordingly, it is an object of the present invention to provide catalysts that can selectively hydrogenate alkynes and alkadienes in the presence of other unsaturated compounds, such as olefins.

It is another object of the present invention to provide catalysts for selectively hydrogenating alkynes and alkadienes in the presence of other unsaturated compounds, such as olefins, that produce relatively fewer oligomers as compared with other, conventional palladium catalysts.

Still another object of the invention is to provide catalysts for the selective hydrogenation of alkynes and alkadienes in the presence of more desirable unsaturated compounds (e.g. olefins) that maintain or improve the conversion and/or minimize the need for hydrogen.

In carrying out these and other objects of the invention, there is provided, in one form, a hydrogenation catalyst having a first constituent of at least one metal or metal-based component, where the metal is nickel or platinum. The catalyst also has a second constituent of at least one metal or metal-based component where the metal is from Groups 1–10 of the Periodic Table of Elements (new IUPAC notation). The catalyst additionally has a third constituent of at least one metal or metal-based component where the metal is from Groups 11–12 of the Periodic Table of Elements (new IUPAC notation). All of these constituents are supported on a fourth constituent of at least one support and/or binder selected from the group consisting of amorphous inorganic oxides, crystalline inorganic oxides, silicon carbide, silicon nitride, boron nitride, carbon, and combinations thereof.

Definitions $C_2H_2$ Conversion:

$$\frac{(C_2H_2)_{in} - (C_2H_2)_{out}}{(C_2H_2)_{in}} \times 100$$

$C_2H_4$ Gain Selectivity:

$$\frac{(C_2H_2)_{in} - (C_2H_2)_{out} - C_2H_{6\,produced} - (2XC_4 + 3XC_6)_{produced}}{(C_2H_2)_{in} - (C_2H_2)_{out}} \times 100$$

$C_2H_6$ Selectivity:

$$\frac{C_2H_{6\,produced}}{(C_2H_2)_{in} - (C_2H_2)_{out}} \times 100$$

Green-Oil Selectivity:

$$\frac{(2XC_4 + 3XC_6)_{produced}}{(C_2H_2)_{in} - (C_2H_2)_{out}} \times 100$$

$(C_2H_2)_{in}$ = Concentration of $C_2H_2$ in feed, in mol %
$(C_2H_2)_{out}$ = Concentration of $C_2H_2$ in product, in mol %
$(C_2H_6)_{produced}$ = Difference in concentration of $C_2H_6$ between feed and product, in mol %

$(C_4+C_6)_{produced}$=Difference in concentration of $C_4$ and $C_6$ between feed and product, in mol %

Similar definitions can be used for MAPD and BD conversions and selectivities.

DETAILED DESCRIPTION OF THE INVENTION

The present invention relates to novel catalysts that are capable of delivering selective hydrogenation performance with high olefin-gain selectivity and low selectivity to green oil (oligomers) and saturates. Additional benefits of the inventive catalysts include, but are not necessarily limited to, the extension of the lifetimes of the catalysts and/or the extension of the operation cycle due to the reduction of green oil.

As used herein, the term "acetylene" includes the hydrocarbon $C_2H_2$ as well as other acetylenic hydrocarbons, such as methyl acetylene. The term "ethylene product stream" includes streams containing the hydrocarbon $C_2H_4$ as well as streams containing other mono- and diolefinically unsaturated hydrocarbons. It will be appreciated, however, that while the catalysts are often discussed in terms of selectively hydrogenating acetylene, MA, PD and optionally, BD in a stream that is predominantly ethylene, propylene and/or butylenes, they are not necessarily limited to the treatment of streams that contain ethylene or propylene or butene, but are expected to find applicability to the selective hydrogenation of other unsaturated compounds in streams of other chemical content as well.

In one non-limiting embodiment of the invention, the selective hydrogenation catalyst of this invention is a non-palladium catalyst and may have three or more metals or metal-based components on a support. By "metal-based component" is meant a metal compound that is not purely the elemental metal. Since there is essentially no thermodynamic limitation to the hydrogenation reaction of alkadienes and alkynes to olefins, the goal of greater than 50% ethylene selectivity is theoretically achievable. More specifically, the inventive catalyst system may include the following constituents:

1. A first constituent of at least one metal or metal-based component selected from the group of nickel and platinum. In one non-limiting embodiment of the invention, platinum is the preferred metal.

2. A second constituent of at least one metal or metal-based component where the metal is from Groups 1–10 of the Periodic Table of Elements (new IUPAC notation). In one non-limiting embodiment of the invention, the metals of preferred second constituents include, but are not necessarily limited to, metals from Groups 8–9 of the Periodic Table of Elements (new IUPAC notation) and mixtures thereof. In a particularly preferred embodiment of the invention, the metal of the second constituent is ruthenium and/or iridium.

3. A third constituent of at least one metal or metal-based component selected where the metal is from the elements of Groups 11–12 of the Periodic Table of Elements (new IUPAC notation). In one non-limiting embodiment of the invention, preferred metals of the third constituent include, but are not necessarily limited to, silver, gold and/or zinc, and mixtures thereof. In a particularly preferred embodiment of the invention, the metal of the third constituent is silver.

4. A fourth constituent of at least one support and/or binder selected from the group of amorphous inorganic oxides such as clay, alumina, silica, aluminophosphate, titania, magnesia, zirconia, etc., or crystalline inorganic oxides such as zeolites, molecular sieves, spinel, perovskite, etc., or any suitable inorganic solid material such as silicon carbide, silicon nitride, boron nitride, carbon, etc.

5. Optionally, a fifth constituent of at least one metal or metal-based component where the metal is from the elements of Groups 13–15 of the Periodic Table of Elements (new IUPAC notation). In one non-limiting embodiment of the invention, preferred elements of the fifth constituents include, but are not necessarily limited to, gallium, iridium, tin and/or bismuth and mixtures thereof.

6. Optionally, sulfur and/or oxygen.

In another non-limiting consideration of the invention, the presence of sulfur and/or oxygen serves to lower the reactivity of a metal towards overhydrogenating an alkadiene and/or alkyne to a saturate, thereby lowering the extent of saturate formation.

The integrated results of these essential and optional constituents are catalysts with superior olefin selectivity, lower saturate selectivity, and lower green oil selectivity compared to the conventional Ni- or Pd-based catalysts.

The non-palladium, low oligomers selectivity catalysts of the invention exhibit substantial activity in the selective hydrogenation of alkynes, on the order of 50 to 95% or more, with very low selectivity to oligomers (green oil). Owing to their low green oil make, the catalysts of the invention are less prone to deactivation by coke formation than current palladium-based commercial formulations and thus provide extended durability.

It is difficult to precisely define the operating parameters of an alkyne/alkadiene selective hydrogenation process in advance due to a number of complex, interrelated factors including, but not necessarily limited to, the chemical composition of the feedstock, the control systems and design of a particular plant, etc (i.e., different reactor configurations including front-end, tail-end, MAPD, and BD converters as mentioned briefly above). Nevertheless, the following descriptions serve to give some sense of how the inventive process may be practiced.

In the case of a front-end (FE) selective hydrogenation reactor, the inlet operating temperature may range from about 30 to about 150° C., preferably from about 50 to about 100° C. Representative operating pressures may range from about 100 pig to about 500 psig (about 690 to 3,500 kPa), preferably from about 200 pig to about 400 psig (about 1400 to 2800 kPa). The GHOST may range from about 5000 to about 20,000, preferably from about 8000 to about 15,000, in non-limiting embodiments of the invention. Further, in other non-limiting embodiments of the invention, the $H_2$ partial pressure may range from about 25 psig to about 175 psig (about 172 to 1200 kPa), preferably from about 50 psig to about 140 psig (about 345 to 965 kPa). The feedstreams in FE selective hydrogenation processes typically contain at least about 20% ethylene, and less than 1% acetylene, with the balance comprising ethane, methane, hydrogen and small amounts of similarly light components. (All percentages are mole % unless otherwise noted). Depending upon the process configuration of the plant, this feed stream can also contain C3 components such as methyl acetylene, propadiene, propylene, and propane. Still heavier components such as 1,3 butadiene; 1,2 butadiene; ethyl acetylene; dimethyl acetylene; vinyl acetylene; cyclopentadiene; benzene; toluene and mixtures thereof may also be present as a result of certain process configurations.

In the case of a tail-end (TE) selective hydrogenation reactor, the inlet operating temperature may range from about 30 to about 150° C., preferably from about 40 to about 90° C. Representative operating pressures may range from about 100 psig to about 500 psig (about 690 to 3,500 kPa), preferably from about 200 psig to about 400 psig (about 1400 to 2800 kPa). The GHSV may range from about 1000 to about 10,000, preferably from about 3000 to about 8000, in non-limiting embodiments of the invention. Further, in other non-limiting embodiments of the invention, the $H_2/C_2H_2$ molar feed ratio may range from about 0.5 to about 20, preferably from about 1.0 to about 1.5. The feedstreams in TE processes for selective hydrogenation processes in may contain about 2% acetylene, about 70% ethylene, and the balance other $C_2$ compounds.

In the case of a methyl acetylene/propadiene (MAPD) selective hydrogenation reactor, operation can be conducted in either the liquid or vapor phase. In the case of the liquid phase, the inlet operating temperature may range from about 20 to about 100° C., preferably from about 30 to about 80° C. Representative operating pressures may range from about 150 psig to about 600 psig (about 1000 to 4100 kPa), preferably from about 250 psig to about 500 psig (about 1700 to 3400 kPa). The LHSV may range from about 0.1 to about 100, preferably from about 1 to about 10, in non-limiting embodiments of the invention. In the case of the vapor phase, the inlet operating temperature may range from about 20 to about 600° C., preferably from about 200 to about 400° C. Representative operating pressures may range from about 150 psig to about 600 psig (about 1000 to 4100 kPa), preferably from about 250 psig to about 500 psig (about 1700 to 3400 kPa). The GHSV may range from about 100 to about 20,000, preferably from about 500 to about 5000, in non-limiting embodiments of the invention. Further, in other non-limiting embodiments of the invention, the $H_2/C_2H_2$ molar feed ratio may range from about 0.5 to about 20, preferably from about 1 to about 10. The feedstreams in MAPD selective hydrogenation processes may contain at least 80% propylene, and less than 10% of a compound selected from the group consisting of methyl acetylene, propadiene, and mixtures thereof.

In the case of a butadiene (BD) selective hydrogenation reactor, operation can be conducted in either the liquid or vapor phase. In the case of the liquid phase, the inlet operating temperature may range from about 20 to about 120° C., preferably from about 40 to about 100° C. Representative operating pressures may range from about 150 psig to about 600 psig (about 1000 to 4100 kPa), preferably from about 200 psig to about 400 psig (about 1400 to 2800 kPa). The LHSV may range from about 0.1 to about 100, preferably from about 1 to about 25, in non-limiting embodiments of the invention. In the case of the vapor phase, the inlet operating temperature may range from about 20 to about 600° C., preferably from about 50 to about 200° C. Representative operating pressures may range from about 150 psig to about 600 psig (about 1000 to 4100 kPa), preferably from about 250 psig to about 500 psig (about 1700 to 3400 kPa). The GHSV may range from about 100 to about 20,000, preferably from about 500 to about 5000, in non-limiting embodiments of the invention. Further, in other non-limiting embodiments of the invention, the $H_2/C_2H_2$ molar feed ratio may range from about 0.5 to about 20, preferably from about 1 to about 10. The feedstreams in BD selective hydrogenation processes may contain at least 90% butylene, and greater than 0.2% butadiene.

The inventive process will now be further illustrated with respect to specific Examples that are intended only to further demonstrate the invention, but not limit it in any way.

EXAMPLE I

This Example illustrates the inferior performance of a current state-of-the-art commercial Pd-based catalyst. The catalyst, G-58C was obtained from Süd Chemie, Inc. and is a Pd/Ag-based catalyst. The catalyst was evaluated under the following conditions: T(catalyst)=100° C., P=300 psig (2068 kPa), GHSV=4500, $H_2/C_2H_2$ feed molar ratio=1.3. The hydrocarbon feed contained 1.65 mole % acetylene, 70 mole % ethylene, and balance nitrogen. Test results are given in Table 1 below.

TABLE 1

| Test # | Catalyst (Ref. #) | $C_2H_2$ conv. (%) | $C_2H_4$ sel. (%) | $C_2H_6$ sel. (%) | $H_2$ conv. (%) | GO sel. (%) |
|---|---|---|---|---|---|---|
| 1 | G58-C | 96.9 | 45 | 28.8 | 100 | 26.2 |

It may be seen that the ethane and the green oil selectivity are 28.8% and 26.2%, respectively.

EXAMPLE II

This Example illustrates the preparation of catalysts used in the present invention.

Control Catalyst A: 0.6% Pt on $Al_2O_3$

Theta-alumina (19.86 g; MI-407, available from W. R. Grace & Co.) was mixed with 70 ml de-ionized $H_2O$ and a slurry was obtained. Then, 0.25 g $H_2PtCl_6 \cdot H_2O$ was dissolved in 20 ml de-ionized $H_2O$. The platinum solution was added to the alumina slurry. After 30 minutes stirring, the slurry was gently heated until most of the water was removed. The resulting paste was dried in a vacuum oven for 2 hours. The remaining powder was calcined under air for 2 hours at 120° C. and 4 hours at 550° C.

Control Catalyst B: 2.4% Ir on $Al_2O_3$

Theta-alumina (19.48 g; MI-407, available from W. R. Grace & Co.) was mixed with 60 ml de-ionized $H_2O$ and a slurry was obtained. Then, 0.88 g $IrCl_3 \cdot 3H_2O$ was dissolved in 20 ml de-ionized $H_2O$. The iridium solution was added to the alumina slurry. After 30 minutes stirring, the slurry was gently heated until most of the water was removed. The resulting paste was dried in a vacuum oven for 2 hours. The remaining powder was calcined under air for 2 hours at 120° C. and 4 hours at 550° C.

Inventive Catalyst C: 0.6% Pt, 2.4% Ir on $Al_2O_3$

Theta-alumina (19.34 g; MI-407, available from W. R. Grace & Co.) was mixed with 50 ml de-ionized $H_2O$ and a slurry was obtained. Then, 0.25 g $H_2PtCl_6 \cdot H_2O$ was dissolved in 10 ml de-ionized $H_2O$. Then, 0.88 g $IrCl_3 \cdot 3H_2O$ was dissolved in 20 ml de-ionized $H_2O$. The iridium solution was mixed with the platinum solution. The solution containing both metals was added to the alumina slurry. After 30 minutes stirring, the slurry was gently heated until most of the water was removed. The resulting paste was dried in a vacuum oven for 2 hours. The remaining powder was calcined under air for 2 hours at 120° C. and 4 hours at 550° C.

Inventive Catalyst D: 1.2% Pt, 7.2% Ir on $Al_2O_3$

Theta-alumina (4.54 g; MI-407, available from W. R. Grace & Co.) was mixed with 30 ml de-ionized $H_2O$ and a slurry was obtained. Then, 0.13 g $H_2PtCl_6 \cdot H_2O$ was dissolved in 20 ml de-ionized $H_2O$. Then, 0.66 g $IrCl_3 \cdot 3H_2O$ was dissolved in 20 ml de-ionized $H_2O$. The iridium solution was mixed with the platinum solution. The solution containing both metals was added to the alumina slurry. After 1 hour stirring, the slurry was gently heated until most of the water was removed. The resulting paste was dried in a vacuum oven for 2 hours. The remaining powder was calcined under air for 2 hours at 120° C. and 4 hours at 550° C.

Inventive Catalyst E: 2.4% Pt, 7.2% Ir on $Al_2O_3$

Theta-alumina (2.68 g; MI-407, available from W. R. Grace & Co.) was mixed with 20 ml de-ionized $H_2O$ and a slurry was obtained. Then, 0.15 g $H_2PtCl_6 \cdot H_2O$ was dissolved in 20 ml de-ionized $H_2O$. Then, 0.40 g $IrCl_3 \cdot 3H_2O$ was dissolved in 20 ml de-ionized $H_2O$. The iridium solution was mixed with the platinum solution. The solution containing both metals was added to the alumina slurry. After 1 hour stirring, the slurry was gently heated until most of the water was removed. The resulting paste was dried in a vacuum oven for 2 hours. The remaining powder was calcined under air for 2 hours at 120° C. and 4 hours at 550° C.

Inventive Catalyst F: 0.6% Pt, 2.4% Ru on $Al_2O_3$

Theta-alumina (4.77 g; SBa-90, available from Sasol Limited) was mixed with 20 ml de-ionized $H_2O$ and a slurry was obtained. Next, 0.06 g $H_2PtCl_6 \cdot H_2O$ was dissolved in 20 ml de-ionized $H_2O$. Then, 0.25 g $RuCl_3 \cdot xH_2O$ was dissolved in 40 ml de-ionized $H_2O$. The platinum solution was mixed with the ruthenium solution. The solution containing both metals was added to the alumina slurry. After 1 hour stirring, the slurry was gently heated until most of the water was removed. The resulting paste was dried in a vacuum oven for 2 hours. The remaining powder was calcined under air for 2 hours at 120° C. and 4 hours at 450° C.

Inventive Catalyst G: 0.6% Pt, 2.4% Ru, 1.2% Ag on $Al_2O_3$

Theta-alumina (38.17 g; SBa-90, available from Sasol Limited) was mixed with 150 ml de-ionized $H_2O$ and a slurry was obtained. Next, 0.50 g $H_2PtCl_6 \cdot H_2O$ was dissolved in 50 ml de-ionized $H_2O$. Then, 1.97 g $RuCl_3 \cdot xH_2O$ was dissolved in 250 ml de-ionized $H_2O$. The platinum solution was mixed with the ruthenium solution. The solution containing both metals was added to the alumina slurry. After 1 hour stirring, the slurry was gently heated until most of the water was removed. The resulting paste was dried in a vacuum oven for 2 hours. The remaining powder was calcined under air for 2 hours at 120° C. and 4 hours at 450° C. Next, 10.0 g of the obtained powder were mixed with 60 ml de-ionized $H_2O$ and a slurry was obtained. Following this, 0.19 g $AgNO_3$ was dissolved in 40 ml de-ionized $H_2O$. The silver slurry was added to the previous slurry. After 1 hour stirring, the slurry was gently heated until most of the water was removed. The resulting paste was dried in a vacuum oven for 2 hours. The remaining powder was calcined under air for 2 hours at 120° C. and 4 hours at 450° C.

EXAMPLE III

This Example shows the synergistic effects of the first and the second constituents. Catalyst compositions are given in the preparatory examples above. Test conditions are the same as in Example I. It may be seen that a higher acetylene conversion (31.0 v. 41.3%) could be obtained by combining Pt (the first constituent) and Ir (the second constituent) as compared to 18.5% for Pt alone and −0.1% for Ir alone. More importantly, the green oil selectivity has been reduced to 13–16%, which is much lower than 26% for the Pd-based catalyst in Example I. Further optimization of the acetylene conversion and ethylene selectivity would be possible with other constituents.

TABLE 2

| Test # | Catalyst (Ref. #) | $C_2H_2$ conv. (%) | $C_2H_4$ sel. (%) | $C_2H_6$ sel. (%) | $H_2$ conv. (%) | GO sel. (%) |
|---|---|---|---|---|---|---|
| 2 | A | 18.5 | −93.6 | 176.6 | 59.3 | 19.0 |
| 3 | B | −0.1 | N/A | N/A | N/A | N/A |
| 4 | C | 31.9 | −30.5 | 114.5 | 64.2 | 16.0 |
| 5 | D | 41.3 | −44.9 | 131.9 | 92.3 | 13.0 |

EXAMPLE IV

This Example illustrates that further improvement of green oil selectivity could be accomplished by controlling the level of the first constituent and the second constituent in catalyst and the amount of hydrogen co-fed. In Examples I and II, the $H_2$/acetylene ratio in feed was 1.3. In this Example, the ratio was reduced to 1.1. The catalyst contained 2.4% Pt and 7.2% Ir on alumina. Other test conditions remain unchanged. The test results are given in Table 3 below.

TABLE 3

| Test # | Catalyst (Ref. #) | $C_2H_2$ conv. (%) | $C_2H_4$ sel. (%) | $C_2H_6$ sel. (%) | $H_2$ conv. (%) | GO sel. (%) |
|---|---|---|---|---|---|---|
| 6 | E | 43.3 | −7.1 | 99.6 | 96.8 | 7.5 |

It may be seen that the green oil selectivity was reduced to just 7.5%, indicating a significant mitigation of green oil formation was accomplished.

EXAMPLE V

As indicated above, further improvement of acetylene conversion and ethylene selectivity can be achieved through optimization of all constituents. An illustration of such an enhancement is given in Table 4 below.

TABLE 4

| Test # | Catalyst (Ref. #) | $C_2H_2$ conv. (%) | $C_2H_4$ sel. (%) | $C_2H_6$ sel. (%) | $H_2$ conv. (%) | GO sel. (%) |
|---|---|---|---|---|---|---|
| 7 | F | 55.8 | 28.4 | 61.1 | 100 | 10.5 |
| 8 | G | 56.3 | 44.2 | 46 | 87.2 | 9.9 |

It can be seen that the performance of the three component system (catalyst G) is superior to that of the two component system (catalyst F), particularly with respect to ethylene selectivity.

EXAMPLE VI

This Example illustrates how the addition of 1 wt % potassium to a catalytic formulation results in lower selectivity to green oil, all other components being the same. The two catalysts were tested under the following conditions: T(catalyst)=100° C., P=300 psig (2068 kPa), GHSV=4500, $H_2/C_2H_2$ feed ratio=1.1. Both catalysts were pretreated at 120° C. for 2 hours in a 5% $H_2$ in He gas mixture. The hydrocarbon feed contained 1.65 mole % acetylene, 70 mole % ethylene, and the balance nitrogen. Test results are given in Table 5 below.

TABLE 5

| Test # | Catalyst | $C_2H_2$ conv. (%) | $C_2H_4$ sel. (%) | $C_2H_6$ sel. (%) | $H_2$ conv. (%) | GO sel. (%) | Coke + GO (g/g $C_2H_2$ conv.) |
|---|---|---|---|---|---|---|---|
| 9 | 0.6% Pt, 2.4% Ru, 1.2% Ag on $SiO_2$ | 52.8 | 15.1 | 74.2 | 95.3 | 10.7 | 0.15 |
| 10 | 0.6% Pt, 2.4% Ru, 1.2% Ag, 1% K on $SiO_2$ | 47.2 | 18.5 | 72.9 | 85.5 | 8.57 | 0.10 |

It may be seen that the green oil selectivity decreased by about 2% with the addition of 1% K. Furthermore, the total amount of green oil+ coke, on a gram/gram of acetylene converted basis (last column), has decreased by about 33% in the case where 1% K was incorporated into the catalyst formulation.

EXAMPLE VII

This Example illustrates how the addition of 1 wt % barium to a catalytic formulation results in lower selectivity to green oil, all other components being the same. The two catalysts were tested under the following conditions: T(catalyst)=100° C., P=300 psig (2068 kPa), GHSV=4500, $H_2/C_2H_2$ feed ratio=1.1. Both catalysts were pretreated at 120° C. for 2 hours in a 5% $H_2$ in He gas mixture. The hydrocarbon feed contained 1.65 mole % acetylene, 70 mole % ethylene, and the balance nitrogen. Test results are given in Table 6 below.

TABLE 6

| Test # | Catalyst | $C_2H_2$ conv. (%) | $C_2H_4$ sel. (%) | $C_2H_6$ sel. (%) | $H_2$ conv. (%) | GO sel. (%) | Coke + GO (g/g $C_2H_2$ conv.) |
|---|---|---|---|---|---|---|---|
| 11 | 0.6% Pt, 2.4% Ru on $SiO_2$ | 51.6 | 4.13 | 85.2 | 100 | 10.6 | 0.14 |
| 12 | 0.6% Pt, 2.4% Ru, 1% Ba on $SiO_2$ | 53.1 | 14 | 76.1 | 100 | 9.91 | 0.12 |

It may be seen that the green oil selectivity decreased by about 0.7% with the addition of 1% Ba. Furthermore, the total amount of green oil+ coke, on a gram/gram of acetylene converted basis (last column), has decreased by about 15% in the case where 1% Ba was incorporated into the catalyst formulation.

In the foregoing specification, the invention has been described with reference to specific embodiments thereof, and has been demonstrated as effective in providing catalysts for directly and selectively hydrogenating acetylene in the presence of other compounds, particularly other unsaturated compounds. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of metals and/or metal-based components, other than those specifically tried, in other proportions or ratios or mixed in different ways, falling within the claimed parameters, but not specifically identified or tried in a particular method to produce a catalyst or to selectively hydrogenate acetylene and/or MAPD and/or BD, are anticipated to be within the scope of this invention. Further, various techniques of combining and formulating the catalysts from the metals and metal-based components that are not explicitly described but nonetheless fall within the appended claims are understood to be included.

What is claimed is:

1. A hydrogenation catalyst consisting of:
    a first constituent of at least one metal or metal-based component where the metal is platinum; and
    a second constituent of at least one metal or metal-based component where the metal is selected from the elements consisting of Groups 8–9 of the Periodic Table of Elements (new IUPAC notation);
    a third constituent of at least one metal or metal-based component where the metal is selected from the elements consisting of Groups 11–12 of the Periodic Table of Elements (new IUPAC notation);
    a fourth constituent of at least one support and/or binder selected from the group consisting of amorphous inorganic oxides, crystalline inorganic oxides, silicon carbide, silicon nitride, boron nitride, carbon, and combinations thereof; and
    optionally a constituent selected from the group consisting of gallium, indium, tin, bismuth, oxygen, sulfur and mixtures thereof.

2. The hydrogenation catalyst of claim 1, wherein the metal in said second constituent is selected from Ir, Ru, and mixtures thereof.

3. The hydrogenation catalyst of claim 1, wherein the metal in said second constituent is Ru.

4. The hydrogenation catalyst of claim 3, wherein the metal in said third constituent is silver.

5. The hydrogenation catalyst of claim 1, wherein the metal in said third constituent is silver.

* * * * *